Feb. 4, 1969

R. E. GAREIS 3,426,349

VEHICLE LOCATING SYSTEM

Filed April 4, 1967

INVENTOR
RONALD E. GAREIS

BY 3,426,349
VEHICLE LOCATING SYSTEM
Ronald E. Gareis, Roanoke, Va., assignor to General
Electric Company, a corporation of New York
Filed Apr. 4, 1967, Ser. No. 628,493
U.S. Cl. 343—6.5                                               1 Claim
Int. Cl. G01s 9/56

ABSTRACT OF THE DISCLOSURE

A series of passive responders spaced along a path traveled by a vehicle are excited by a single frequency signal radiated by a transmitter carried on the vehicle. Each responder produces a different RF frequency signal in response to this excitation and radiates it to a wideband receiver carried on the vehicle. A number of bandpass filter circuits are connected to the receiver to detect incoming signals having frequencies corresponding to frequencies generated at fixed locations on the vehicle path. The magnitude of a frequency being detected is indicative of the location of the vehicle.

Background of the invention

In the fields of transporting both people and materials it is often necessary that the precise location of a vehicle be known in order to effectuate certain control operations, such as acceleration or deceleration of the vehicle. A vehicle locating system must be both reliable and inexpensive and yet capable of functioning under adverse conditions. The present invention meets each of these criteria.

Summary of the invention

The present invention comprises a vehicle control system including a series of passive responders which are spaced from one another along a path traveled by a vehicle. The passive responders are excited by the single frequency radiated from a transmitter carried on a vehicle. Each excited responder generates a different RF frequency signal which is radiated back to the vehicle. A wideband receiver on the vehicle receives these signals. This receiver includes means for correlating the frequency of the signal generated by one of the responders with a predetermined frequency representing one of the fixed locations. The magnitude of the frequency being correlated indicates the precise location of the vehicle. Each responder includes an antenna connected directly to the emitter of a transistor and indirectly to the collector of the transistor through a coupling capacitor. A frequency generator in the responder includes a crystal and a capacitor connected in series through a portion of the antenna. The generator produces a current having a predetermined frequency which is applied to the base of the transistor through a second capacitor.

Description of the drawings

While the specification concludes with claims particularly pointing out and distinctly claiming that which is regarded as the present invention, the details of the invention along with its organization and further advantages may be more readily ascertained from the following detailed description when read in conjunction with the accompanying drawings in which:

Detailed description

Figure 1:
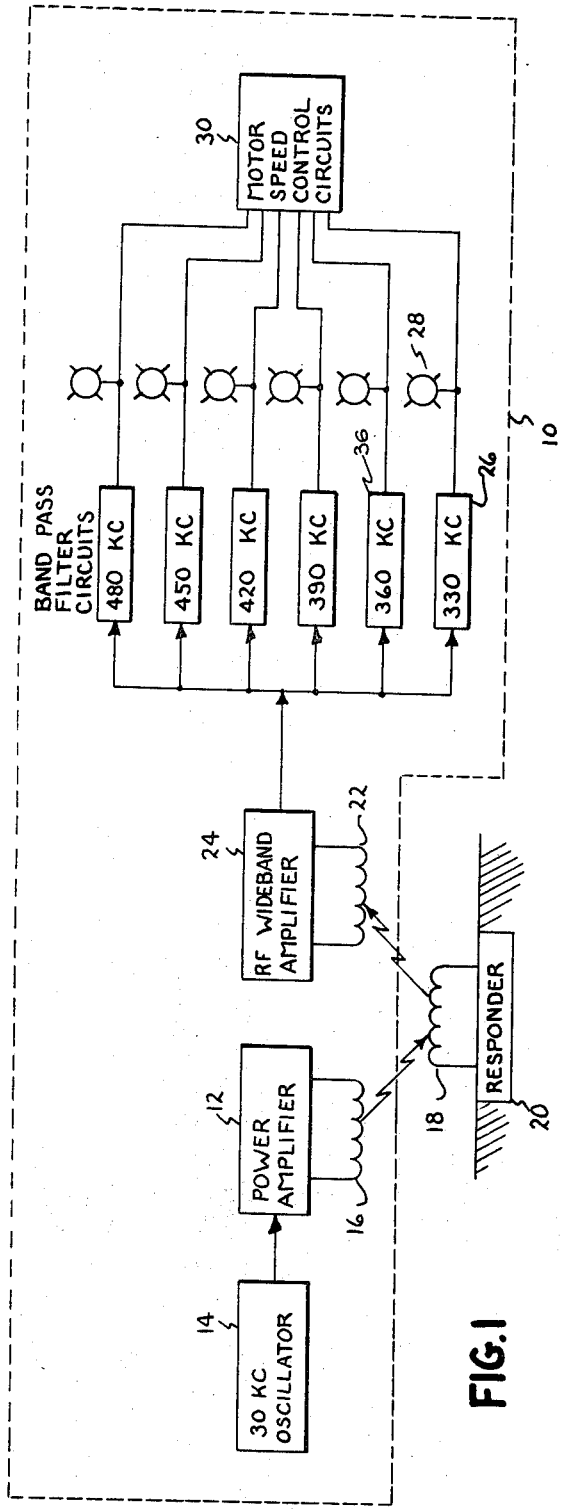
FIG. 1 is a block diagram of the vehicle locating system built in accordance with the present invention.

Referring now to FIG. 1, a vehicle shown only symbolically by a dotted line 10 has mounted therein a power amplifier 12 driven by an oscillator 14 at a suitable frequency; e.g., 30 kc. The power amplifier 12 has a transmitting antenna 16 from which a 30 kc. signal is radiated. This signal is picked up by an antenna 18 connected to a passive responder 20 located on the ground in the vehicle path. In the most common situation, the vehicle path would be a railroad track and the responder 20 would be buried in the track bed between the rails. The responder 20 is excited by the signal radiated from the antenna 16 and reacts to produce a signal having a second, considerably higher frequency. This higher frequency signal is radiated from the antenna 18 and is picked up by an antenna 22 on an RF wideband amplifier 24 mounted in the vehicle.

The amplifier 24 amplifies the signal picked up by the antenna 22 and delivers it to a plurality of bandpass filter circuits, each of which produces an output voltage only if its input is at or near a predetermined frequency. For instance, a 330 kc. bandpass filter circuit 26 produces an output voltage only if the signal being radiated from the responder 20 is near 330 kc. An output voltage from the 330 kc. bandpass filter circuit 26 may be used to energize an indicator 28 as well as to control the speed of the vehicle drive motor through a motor speed control circuit 30. Since the motor speed control circuit 30 may be one of several well known types and by itself forms no part of the present invention, it is not described in detail. Since each responder 20 produces a signal at a different RF frequency, the location of the vehicle may be ascertained by determining which of the bandpass filter circuits is producing an output voltage at a particular time. Thus, the filter circuits and their attached indicators correlate the frequency of the signal radiated by the responders with predetermined frequencies corresponding to the fixed locations of the responders. The motor speed control circuit 30 responds to the voltages appearing on the outputs of the bandpass filter circuits to vary the speed at which the vehicle is driven according to a prearranged program.

Figure 2:
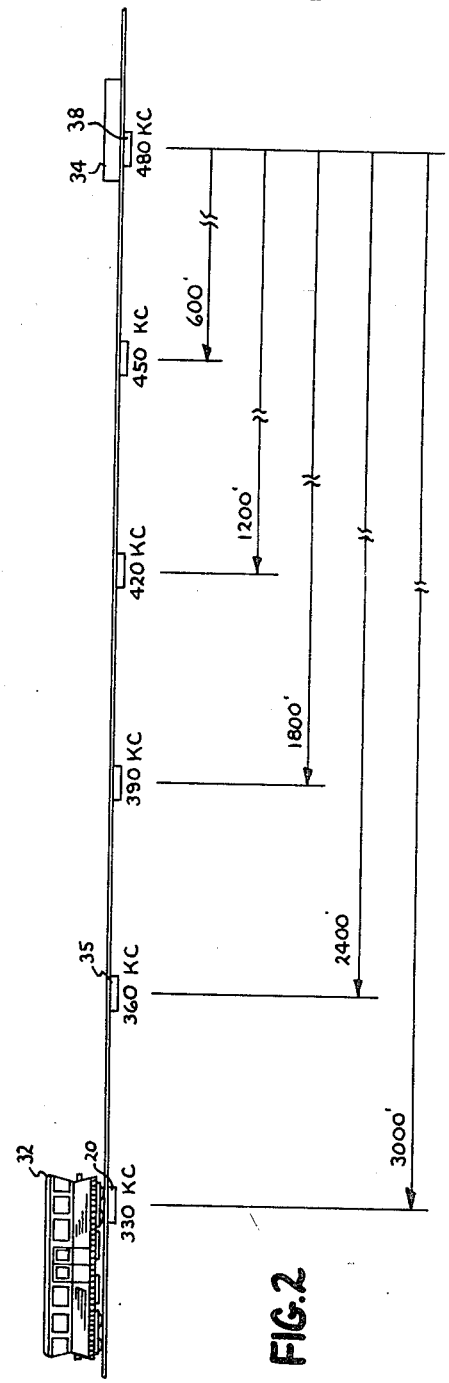
FIG. 2 is a simplified view of one application of the vehicle locating system.

FIG. 2 shows one application of the vehicle locating system shown in block diagram form in FIG. 1. A vehicle 32, which may be part of a rapid transit system, is shown at a distance of 3000 feet from a platform 34 at which the vehicle 32 is to stop. As the vehicle 32 passes over a responder 20, the responder is excited by the 30 kc. signal radiated from the antenna 16. The responder generates and radiates a 330 kc. signal which is picked up by the antenna 22 of the RF wideband amplifier 24. The 330 kc. signal is detected by the bandpass filter circuit 26 which produces an output voltage to energize the indicator 28 and to provide an input to the motor speed control circuit 30. The motor speed control circuit 30 may at this point cause the drive motors for the vehicle 32 to begin to decelerate the vehicle. As the vehicle passes over the next responder 35, the responder 35 is energized by the 30 kc. signal radiated from the antenna 16 and generates and radiates an RF signal at 360 kc. This 360 kc. signal is picked up by the antenna 22, is detected by a bandpass filter circuit 36, and is applied to the motor speed control circuit 30 to cause the vehicle 32 to decelerate further. This process is repeated as the vehicle 32 approaches the platform 34. When the vehicle 32 is directly over a responder 38 located at the edge of the platform, the excitation of the responder 38 results in the generation and radiation of a 480 kc. signal which, when picked up by the amplifier 24, is filtered and applied to the motor speed control circuit 30 to bring the vehicle 32 to a complete stop.

While the present invention may be used to great advantage in a platform approach control system such as that shown in FIG. 2, it has much wider application. For instance, this type of system may be utilized to control the speed of automated trains with each different frequency radiated from a responder being indicative of a different command for a motor speed control circuit 30. Such a system might be used in mines where untended trains could haul coal or ore from a working place through circuitous mine tunnels to the surface or to an unloading station beneath ground. Moreover, it is well within the realm of practicability to utilize a system constructed in accordance with the present invention to regulate the approach of automative vehicles to toll stations and the like.

Figure 3:
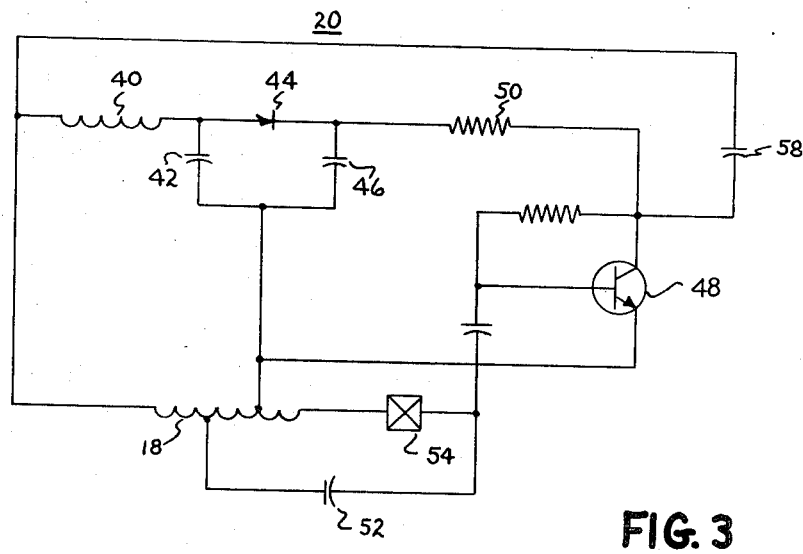
FIG. 3 is a schematic diagram of a responder for use in the vehicle locating system.

Systems intended for such applications must be as reliable as possible. For this reason, AC coupled circuits such as those described below are preferred to logic circuitry in the construction of the various components of the system. FIG. 3 shows the responder 20 with antenna 18. The antenna 18 picks up the 30 kc. signal radiating from the vehicle and applies it to a tuned circuit including an RF choke 40 and a capacitor 42. The signal at the upper terminal of the capacitor 42 is rectified by a diode 44 and is filtered by a capacitor 46 to provide a DC potential, used to bias a transistor 48 through a collector resistor 50. The base of the transistor 48 is capacitively coupled to a crystal 54 which, in a preferred embodiment, is made of a ceramic material in order to obtain fast crystal response. The crystal 54 is in circuit with a capacitor 52 which offsets the capacitance inherent in the structure of the crystal 54. When the transistor 48 is biased through the resistor 50, the crystal 54 causes an AC positive feedback voltage to be applied to the base of the transistor 48 which oscillates at a rate determined by the properties of the crystal 54. This AC voltage, which is in a frequency range of 310 kc. to 480 kc. in a preferred embodiment, appears at the collector of the transistor 48 and is conducted to the antenna 18 through an RF shunt capacitor 58. The RF signal appearing on the antenna 18 is radiated to an antenna connected to the wideband amplifier mounted on the vehicle.

Figure 4:
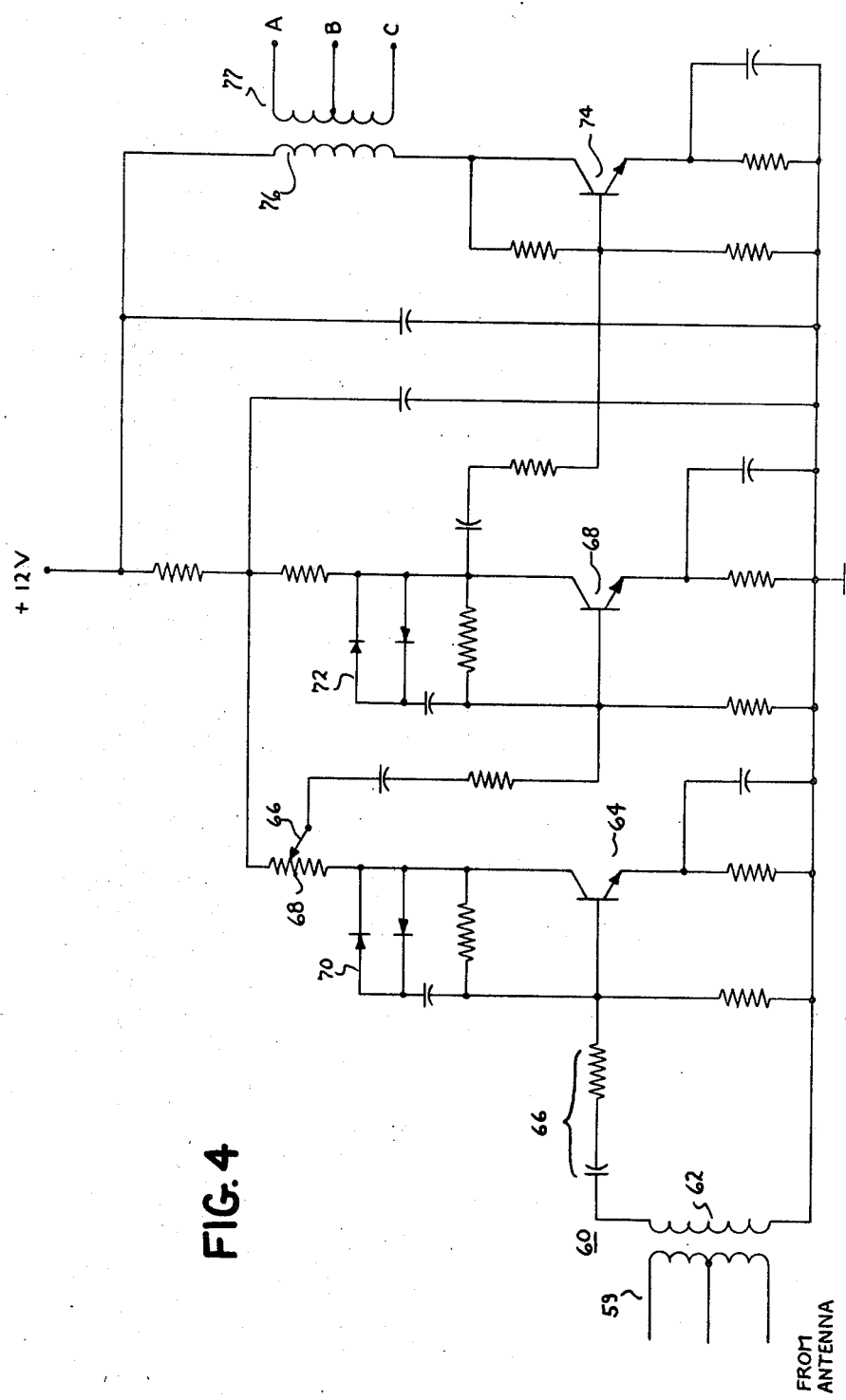
FIG. 4 is a schematic of a wideband RF receiver for use in the vehicle locating system.

One embodiment of a wideband amplifier is shown in FIG. 4. RF signals picked up by a receiver antenna (not shown) appear across a primary winding 59 of an input transformer 60. The signals are established in transformer's secondary winding 62 and are applied to the base of a transistor 64 through a series RC combination 66 in the base circuit. The amplifier circuit including the transistor 64 is a conventional circuit and is not described in great detail. The RF signal is amplified by the transistor 64 and appears across the resistor 68. The magnitude of this RF signal may be adjusted by a sensitivity regulating potentiometer 66 before the RF signal is applied to the base of a transistor 68 in the second stage of the amplifier.

The first and second stages of the amplifier shown in FIG. 4 includes pairs 70 and 72 of inversely-poled diodes. The function of these diodes is to limit the magnitude of the signal amplified by the transistors if the input signal applied at the base of the transistors becomes too great. Excessive signal magnitude may occur if the receiver antenna passes more closely to the responder antenna than was intended. The RF signal amplified by the transistor 68 is applied to the base of another transistor 74 having a winding 76 in its collector circuit. The winding 76 is electromagnetically coupled to winding 77 which provides a common input at terminals A, B, and C for a plurality of bandpass filter circuits, each of which has an output voltage only if the frequency of the voltage appearing across the winding 77 is near the frequency at which the particular bandpass filter circuit is to operate.

Figure 5:
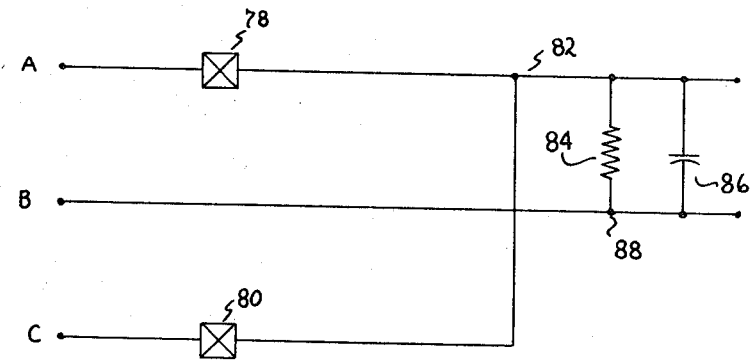
FIG. 5 is a schematic diagram of a bandpass filter circuit for use in combination with the wideband receiver of FIG. 4.

Each bandpass filter circuit is identical to the filter circuit shown in FIG. 5 although each crystal in each filter has a different resonant frequency. Each bandpass filter circuit includes a first crystal 78 and a second crystal 80 connected to input terminals A and B, respectively. The crystals 78 and 80 are tied together at a common junction 82 at the upper end of the parallel combination of a resistor 84 and a capacitor 86. The junction 82 forms one output terminal for the bandpass filter circuit whereas the other output terminal is formed at the lower junction 88 of the resistor 84 and the capacitor 86. The terminal 88 is directly connected to the output terminal B of the winding 77. To obtain a signal amplitude of reasonable bandwidth across the terminal 88 and 82, the crystal 78 is selected to have a resonant frequency of 500 to 1000 cycles per second above the resonant frequency of the crystal contained in the proper responder. Similarly, the crystal 80 has a resonant frequency of 500 to 1000 cycles per second below the resonant frequency of the responder crystal. For example, if the bandpass filter circuit containing the crystals 78 and 80 is to detect a 480 kc. signal, the resonant frequency of the crystal 78 should be approximately 480.5–481 kc. while the resonant frequency of the crystal 80 should be approximately 479–479.5 kc. When the crystals have these resonant frequencies, the bandpass filter circuit acts as a double tuned circuit to produce a broad but sharply defined bandpass signal having two spaced peaks. The frequency spacing of the crystals 78 and 80 also allows some tolerance in the frequency of the responder crystal.

The voltage appearing across the output terminals of each bandpass filter circuit may be applied to an indicator as well as to motor speed controlling circuitry so that the detected frequency may be correlated visually or electrically with a fixed location or command.

Since the transistors utilized in the described embodiment in the present invention will not pass a signal if they are either short circuited or open circuited, the circuit does not allow false indications even if there is a component failure. Also, the relative simplicity of the described system allows it to be constructed relatively inexpensively. A further advantage of the present invention is its increased performance due to its low susceptibility to electrical noise. Because the signal transmitted from the vehicle-mounted transmitter to the responders is a single coninuous frequency, noise reducing techniques such as the integrating out of impulse type noise are used to improve the signal-to-noise ratio of the signals.

While there has been described at present what is regarded as a preferred embodiment of the present invention, it is obvious that modifications and variations therein will occur to those skilled in the art. Therefore, it is intended that the appended claims shall cover all such variations and modifications as fall within the true spirit and scope of the invention.

What I claim is:

1. A responder for use in a vehicle control system including a vehicle-mounted transmitter for radiating a signal at a single predetermined frequency and a vehicle-mounted wideband receiver for receiving signals radiated from individual responders spaced from one another at fixed locations on the path traveled by the vehicle and for correlating the frequency of the received signals with particular responder locations, each of said responders including:
(a) an antenna;
(b) a first capacitor connected at one end to a point on said antenna;
(c) a transistor having its emitter connected directly to a second point on said antenna and its collector connected to the other end of said first capacitor;
(d) a second capacitor connected at one end to the base of said transistor;
(e) a frequency generator including a crystal and a capacitor connected in series through a portion of said antenna, said generator being connected to the base of said transistor through said second capacitor to apply to said transistor a current having a predetermined frequency.

References Cited

UNITED STATES PATENTS 2,910,579   10/1959   Jones et al. _____ 343—6.5 X
3,054,100   9/1962   Jones _____ 343—6.5

RODNEY D. BENNETT, *Primary Examiner.*

M. F. HUBLER, *Assistant Examiner.*

U.S. Cl. X.R.

343—6.8